US011069151B2

United States Patent
Du (10) Patent No.: US 11,069,151 B2
(45) Date of Patent: Jul. 20, 2021

(54) METHODS AND DEVICES FOR REPLACING EXPRESSION, AND COMPUTER READABLE STORAGE MEDIA

(71) Applicant: Guangdong Oppo Mobile Telecommunications Corp., Ltd., Guangdong (CN)

(72) Inventor: Chengpeng Du, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 5 days.

(21) Appl. No.: 16/542,025

(22) Filed: Aug. 15, 2019

(65) Prior Publication Data
US 2020/0058171 A1 Feb. 20, 2020

(30) Foreign Application Priority Data
Aug. 16, 2018 (CN) .......................... 201810934577.8

(51) Int. Cl.
*G06T 19/20* (2011.01)
*G06F 3/0482* (2013.01)
(Continued)

(52) U.S. Cl.
CPC ............ *G06T 19/20* (2013.01); *G06F 3/0482* (2013.01); *G06F 3/04845* (2013.01);
(Continued)

(58) Field of Classification Search
CPC ... G06F 3/0482; G06F 3/04845; G06T 13/40; G06T 19/20; G06T 2219/2021
See application file for complete search history.

(56) References Cited

U.S. PATENT DOCUMENTS

2014/0176662 A1* 6/2014 Goodman .............. H04N 7/141
348/14.07
2014/0192059 A1* 7/2014 Koperwas ............... G06T 13/40
345/473
(Continued)

FOREIGN PATENT DOCUMENTS

| CN | 104616347 A | 5/2015 |
| CN | 106920277 A | 7/2017 |

(Continued)

OTHER PUBLICATIONS

Fasel et al., "Automatic facial expression analysis: a survey", Pattern Recognition, vol. 36 issue 1, Jan. 2003, p. 259-275. (Year: 2003).*

(Continued)

*Primary Examiner* — Michelle L Sams (57) ABSTRACT

The present disclosure provides a method and a device for replacing an expression. The method includes: acquiring a current expression represented by a currently-reconstructed 3D face model; acquiring a target expression from a user; acquiring, based on the current expression and the target expression, values for adjusting coordinates of a first set of key points on the currently-reconstructed 3D face model; and adjusting the coordinates of the first set of key points on the currently-reconstructed 3D face model based on the values, to generate a 3D face model representing the target expression.

8 Claims, 10 Drawing Sheets

(51) Int. Cl.
*G06F 3/0484* (2013.01)
*G06K 9/00* (2006.01)
*G06T 13/40* (2011.01)

(52) U.S. Cl.
CPC ..... *G06K 9/00302* (2013.01); *G06K 9/00281* (2013.01); *G06T 13/40* (2013.01); *G06T 2219/2021* (2013.01)

(56) References Cited

U.S. PATENT DOCUMENTS

| | | | |
|---|---|---|---|
| 2014/0362091 | A1 | 12/2014 | Bouaziz et al. |
| 2018/0204052 | A1 | 7/2018 | Li et al. |

FOREIGN PATENT DOCUMENTS

| | | | |
|---|---|---|---|
| CN | 107123160 | A | 9/2017 |
| CN | 107479801 | A | 12/2017 |
| CN | 107481317 | A | 12/2017 |
| CN | 108022206 | A | 5/2018 |
| CN | 108229239 | A | 6/2018 |
| CN | 108230252 | A | 6/2018 |
| CN | 109147024 | A | 1/2019 |
| EP | 2993614 | A1 | 3/2016 |
| WO | 2009067560 | A1 | 5/2009 |

OTHER PUBLICATIONS

K. Suzuki et al., "Recognition and mapping of facial expressions to avatar by embedded photo reflective sensors in head mounted display," 2017 IEEE Virtual Reality (VR), Los Angeles, CA, USA, 2017, pp. 177-185, doi: 10.1109/VR.2017.7892245. (Year: 2017).*
OA for EP application No. 19191508.1 dated Jan. 17, 2020.
International Search Report for PCT application PCT/CN2019/100601 dated Oct. 28, 2019.
Office Action with English Translation for CN application 201810934577.8 dated Jan. 6, 2020.
Application of quantum neural networks in facial expression recognition; Peng Li; 4 pages, 2007.
Extended EP Search Report for EP Application 19191508.1 dated May 27, 2020.
English translation of Second OA for CN application 201810934577.8 dated Jun. 9, 2020.
Computer Animation Algorithms and Techniques; Rick Parent; ISBN: 9780124158429; 15 pages with English Translation.
Decision on Rejection with English translation of for CN Application 201810934577.8 dated Oct. 10, 2020.
India Examination Report for IN Application 201914032485 dated Feb. 22, 2021. (5 pages).

* cited by examiner

METHODS AND DEVICES FOR REPLACING EXPRESSION, AND COMPUTER READABLE STORAGE MEDIA

CROSS-REFERENCE TO RELATED APPLICATION(S)

This application claims priority to Chinese Patent Application No. 201810934577.8, filed on Aug. 16, 2018, the entire disclosure of which is incorporated herein by reference.

TECHNICAL FIELD

The present disclosure relates to a field of portrait processing technologies, and more particularly, to a method and a device for replacing an expression, and a computer readable storage medium.

BACKGROUND

As computer technologies progress, face-based image processing technologies develop from two-dimension (2D) to three-dimension (3D). The 3D image processing technologies have got wide attention due to the sense of reality.

In the related art, after reconstructing the 3D face model, if the user is not satisfied with the reconstructed 3D face model, it is required to reconstruct the 3D face model again, which results in a large amount of calculation and low modeling efficiency.

SUMMARY

Embodiments of a first aspect of the present disclosure provide a method for replacing an expression. The method includes: acquiring a current expression represented by a currently-reconstructed three-dimensional (3D) face model; acquiring a target expression from a user; acquiring, based on the current expression and the target expression, values for adjusting coordinates of a first set of key points on the currently-reconstructed 3D face model; and adjusting the coordinates of the first set of key points on the currently-reconstructed 3D face model based on the values, to generate a 3D face model representing the target expression.

Embodiments of a second aspect of the present disclosure provides an electronic device including a memory, a processor, and a computer program stored on the memory and operable on the processor. The processor is configured to execute the computer program, to carry out the method for replacing the expression as described in the above embodiments of the first aspect.

Embodiments of a third aspect of the present disclosure provide a computer readable storage medium having a computer program stored thereon. When the computer program is executed by a processor, the method for replacing the expression as described in the above embodiments of the first aspect is implemented.

Additional aspects and advantages of the present disclosure will be given in part in the following descriptions, become apparent in part from the following descriptions, or be learned from the practice of the embodiments of the present disclosure.

BRIEF DESCRIPTION OF DRAWINGS

These and other aspects and/or advantages of embodiments of the present disclosure will become apparent and more readily appreciated from the following descriptions made with reference to the accompanying drawings, in which.

DETAILED DESCRIPTION

Embodiments of the present disclosure will be described in detail and examples of embodiments are illustrated in the drawings. The same or similar elements and the elements having the same or similar functions are denoted by like reference numerals throughout the descriptions. Embodiments described herein with reference to the drawings are explanatory, serve to explain the present disclosure, and are not construed to limit embodiments of the present disclosure.

In view of the problem of low modeling efficiency due to reconstructing the 3D face model again when the user is not satisfied with the reconstructed 3D face model in the related art, the present disclosure provides a method, a device, and a computer readable storage medium for replacing an expression. In the present disclosure, a difference between a satisfactory 3D face model and a currently-reconstructed 3D face model may be found, and the currently-reconstructed 3D face model may be adjusted based on the difference to acquire the satisfactory 3D face model, thereby improving the modeling efficiency on the 3D face model.

A method, a device, and a computer readable storage medium for replacing an expression provided in an embodiment of the present disclosure will be described below with reference to the drawings. The method provided in the embodiment of the present disclosure may be applicable to computer devices having an apparatus for acquiring depth information and color information. The apparatus for acquiring depth information and color information (i.e., 2D information) may be a dual-camera system or the like. The computer devices may be hardware devices having various operating systems, touch screens, and/or display screens, such as mobile phones, tablet computers, personal digital assistants, wearable devices, or the like.

Figure 1:
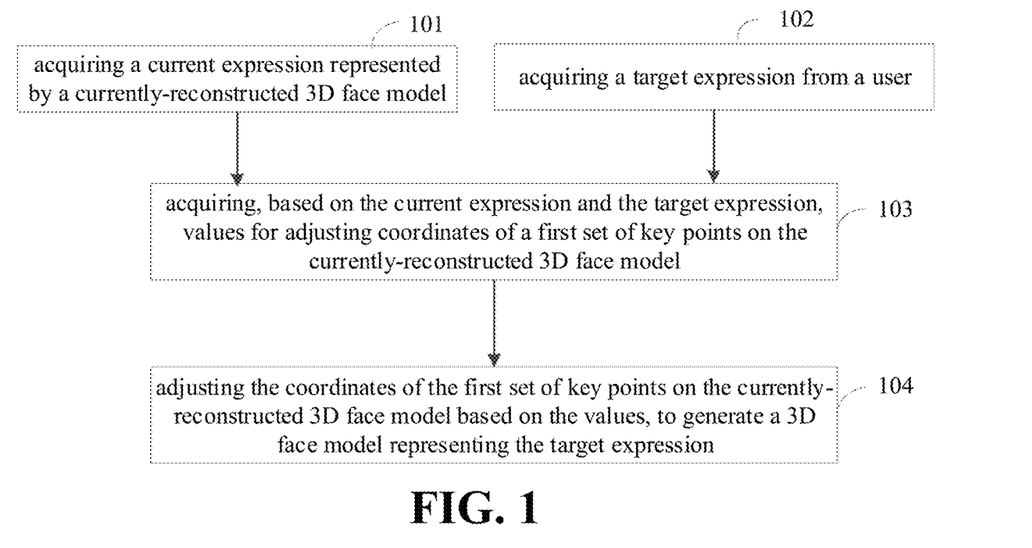
FIG. 1 is a flowchart of a method for replacing an expression according to embodiments of the present disclosure.

FIG. 1 is a flowchart of a method for replacing an expression according to embodiments of the present disclosure. As illustrated in FIG. 1, the method includes acts in the following blocks.

At block 101, a current expression represented by a currently-reconstructed 3D face model is acquired.

The 3D face model may be actually represented by points and a triangular network formed by connecting the points. Some points corresponding to portions having main influence (i.e., key portions) on a shape of the entire 3D face model may be referred to as key points. The expression may be represented by a set of key points. Different sets of key points may distinguish different expressions. The set of key points may correspond to the key portions (such as mouth and eyes) representing differentiation of the expression.

Figure 2:
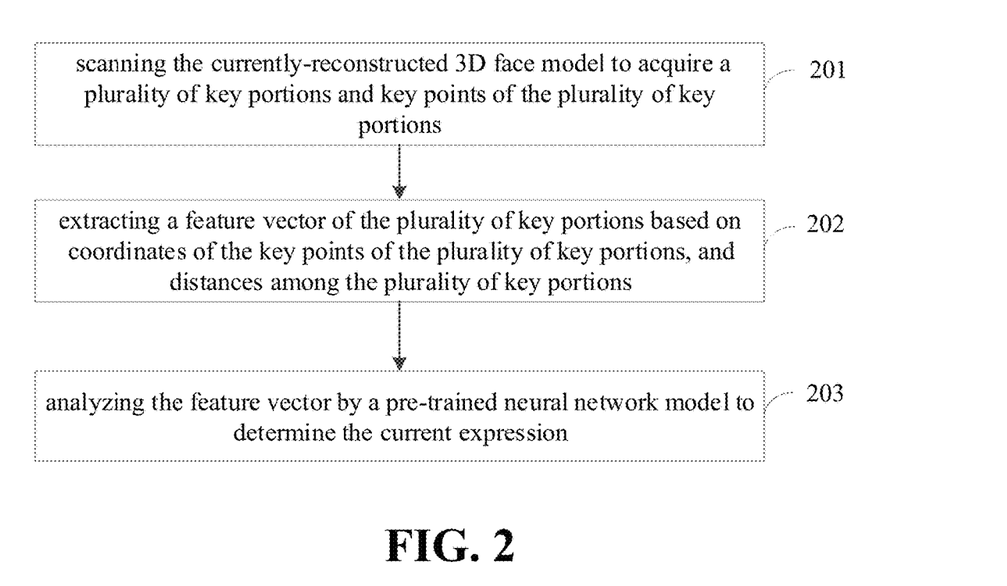
FIG. 2 is a flowchart of a method for replacing an expression according to embodiments of the present disclosure.

Based on different scenarios, manners of acquiring the current expression may be different. As a possible manner, as illustrated in FIG. 2, the current expression is acquired through the following acts.

At block 201, the currently-reconstructed 3D face model is scanned to acquire a plurality of key portions and key points of the plurality of key portions.

At block 202, a feature vector of the plurality of key portions is extracted based on coordinates of the key points of the plurality of key portions, and distances among the plurality of key portions.

At block 203, the feature vector is analyzed by a pre-trained neural network model to determine the current expression.

In this example, the neural network model is trained in advance based on a large amount of experimental data. Inputs of the neural network model may be the feature vector corresponding to the coordinates of the key points of the plurality of key portions and the distances among the plurality of key portions. An output of the neural network model is the expression.

The key points of the plurality of key portions in the currently-reconstructed 3D face model are determined. For example, the key points of the key portions (such as the mouth) are determined by image recognition technologies. The feature vector of the plurality of key portions is extracted, based on the coordinates of the key points of the plurality of key portions and the distances among the plurality of key portions. The feature vector of the plurality of key portions is analyzed through the pre-trained neural network model to determine the current expression of the 3D face model.

At block 102, a target expression from a user is acquired.

Figure 3:
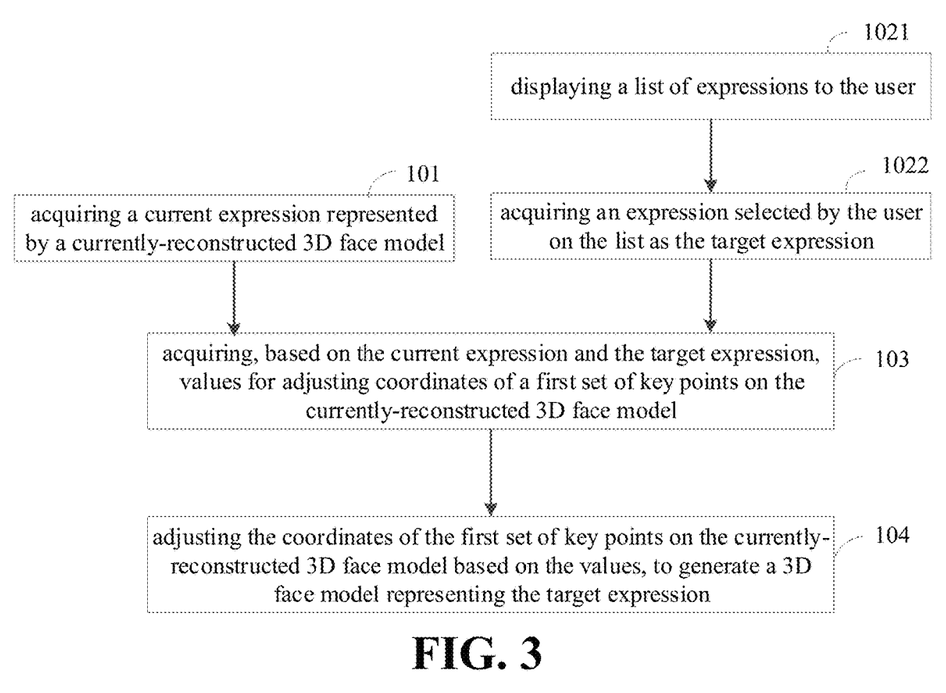
FIG. 3 is a flowchart of a method for replacing an expression according to embodiments of the present disclosure.

In an embodiment, as illustrated in FIG. 3, the act in block 102 may include acts at block 1021 and block 1022. At block 1021, a list of expressions is displayed to the user. At block 1022, an expression selected by the user on the list is acquired as the target expression.

Figure 4:
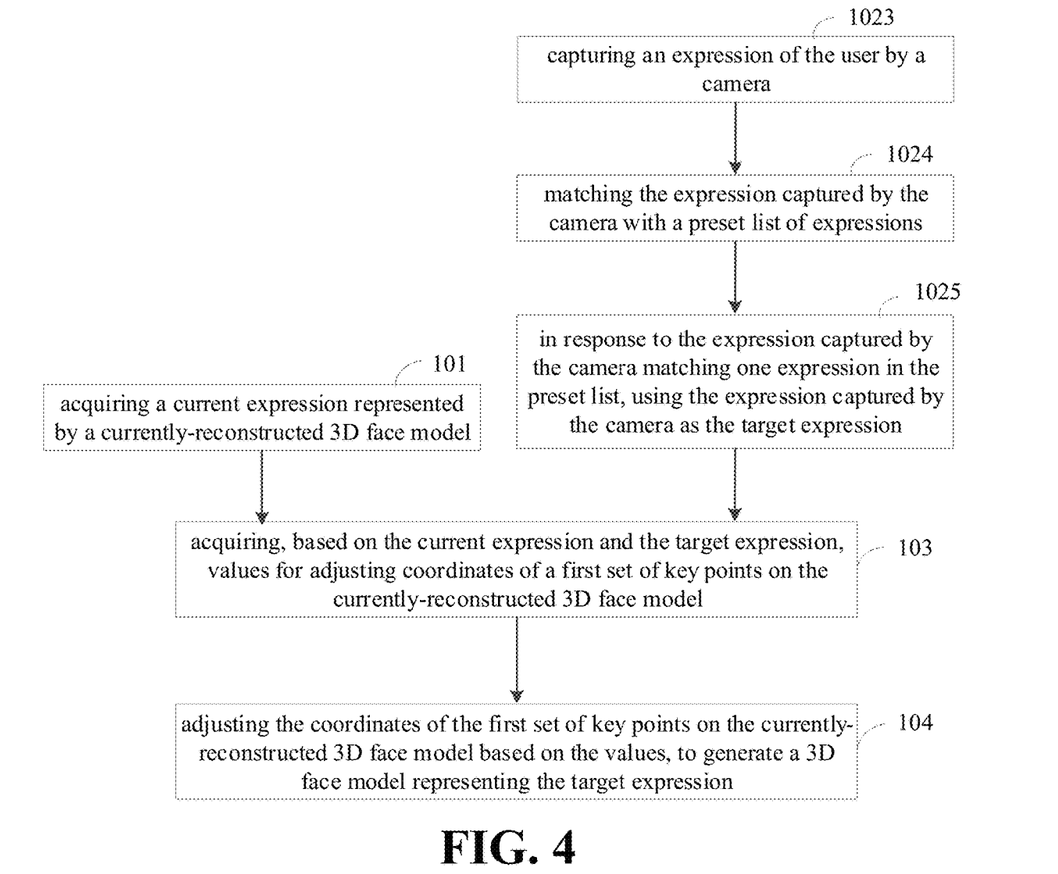
FIG. 4 is a flowchart of a method for replacing an expression according to embodiments of the present disclosure.

In another embodiment, as illustrated in FIG. 4, the act in block 102 may include acts at block 1023, block 1024, and block 1025. At block 1023, an expression of the user is captured by a camera. For example, the camera may capture 2D face images for the same scene, and acquire the expression of the user based on the 2D face images thought the image processing technologies. At block 1024, the expression captured by the camera is matched with a preset list of expressions. At block 1025, in response to the expression captured by the camera matching one expression in the preset list, the expression captured by the camera is used as the target expression.

The list of expressions may be preset in advance, which may basically, cover all requirements of the user for changing expressions. For example, the list may include four commonly-used expressions such as happy, sad, distressed and mourning. Also, the list may further include other expressions, which is not limited herein.

At block 103, based on the current expression and the target expression, values for adjusting coordinates of a first set of key points on the currently-reconstructed 3D face model are acquired.

At block 104, the coordinates of the first set of key points on the currently-reconstructed 3D face model is adjusted based on the values, to generate a 3D face model representing the target expression.

As analyzed above, the 3D face model is actually reconstructed by the points. Therefore, the change and reconstruction of the face model is actually realized by changing coordinate values of the points. Therefore, in the embodiment of the present disclosure, in order to realize the reconstruction of the 3D face model corresponding to the target expression, it is necessary to acquire the values for adjusting the coordinates of the first set of key points on the currently-reconstructed 3D face model, so as to correspondingly adjust the coordinates of the first set of key points based on the values, to generate the 3D face model representing to the target expression.

Manners of acquiring the values for adjusting the coordinates of the first set of key points on the currently-reconstructed 3D face model may be varied with scenarios. The examples are as follows.

First Way

Figure 5:
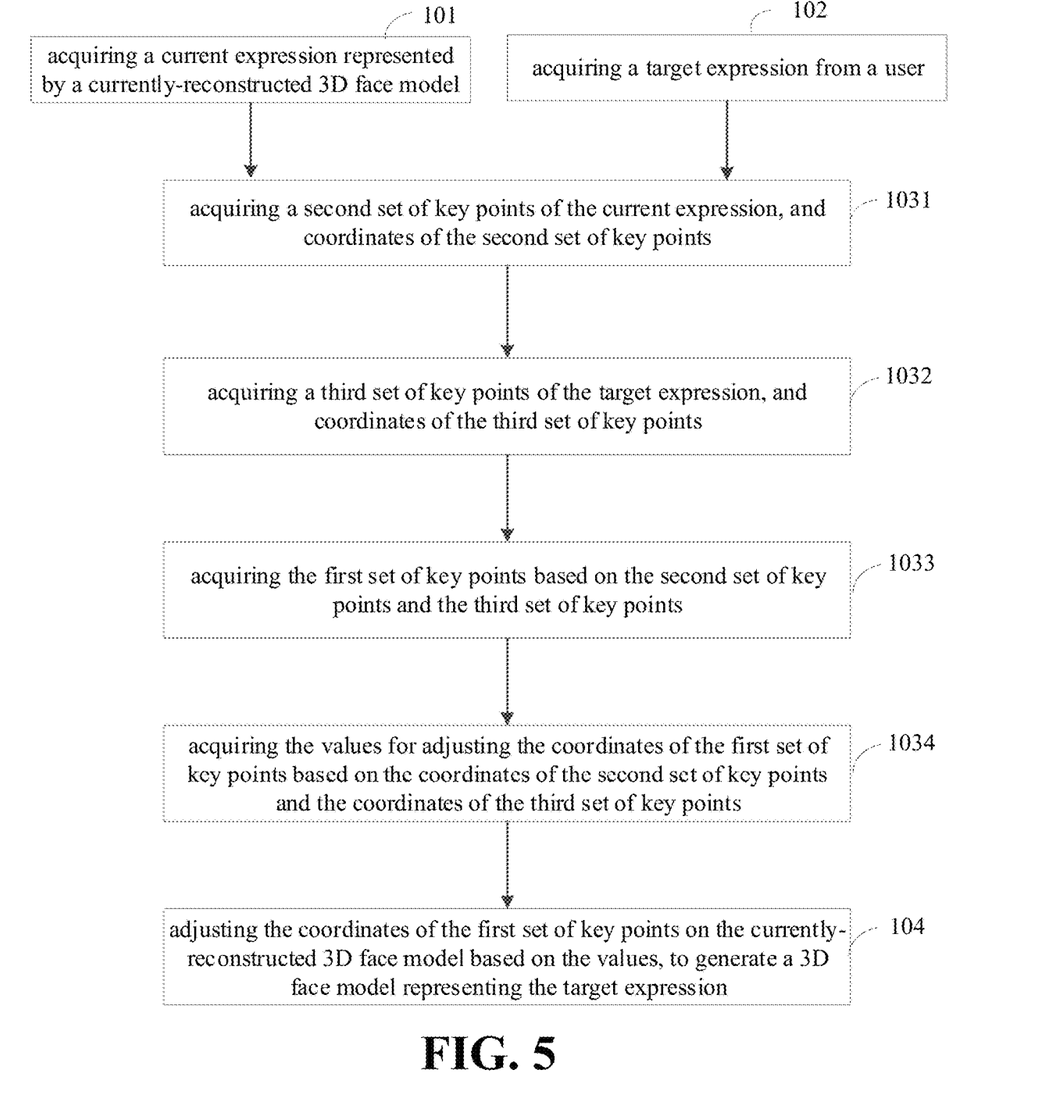
FIG. 5 is a flowchart of a method for replacing an expression according to embodiments of the present disclosure.

In this embodiment, as illustrated in FIG. 5, the values for adjusting the coordinates of the first set of key points on the currently-reconstructed 3D face model may be acquired by the following acts.

At block 1031, a second set of key points of the current expression, and coordinates of the second set of key points are acquired.

The second set of key points of the current expression, and the coordinates of the second set of key points may be preset in advance.

At block 1032, a third set of key points of the target expression, and coordinates of the third set of key points are acquired.

The third set of key points of the target expression, and the coordinates of the third set of key points being preset may be preset in advance.

At block 1033, the first set of key points is acquired based on the second set of key points and the third set of key points.

At block 1034, the values for adjusting the coordinates of the first set of key points are acquired based on the coordinates of the second set of key points and the coordinates of the third set of key points.

The preset database may include a plurality of expressions. The plurality of expressions may be acquired in advance. For each of the plurality of expressions, the corresponding set of key points, and coordinates of the corresponding set of key points may also be acquired in advance and stored in the database. If the current expression and the target expression are acquired, the database may be searched for to acquire the second set of key points of the current expression, and the coordinates of the second set of key points, and the third set of key points of the target expression, and the coordinates of the third set of key points. Then, the first set of key points may be acquired. The first set of key points may include key points in the second set and in the third set. And then, the values for adjusting the coordinates of the first set of key points may be acquired based on the coordinates of the second set of key points and the coordinates of the third set of key points.

Second Way

Figure 6:
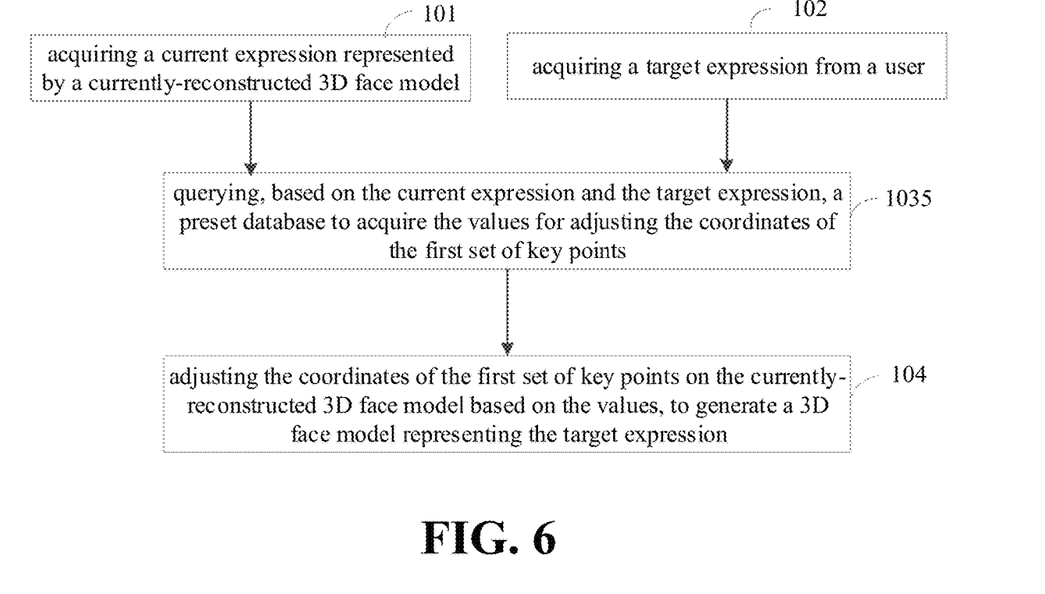
FIG. 6 is a flowchart of a method for replacing an expression according to embodiments of the present disclosure.

In this embodiment, the preset database may include a plurality of expressions. The plurality of expressions may be acquired in advance. For each of the plurality of expressions, the corresponding set of key points, and coordinates of the corresponding set of key points may also be acquired in advance and stored in the database. The values for adjusting the coordinates of the corresponding set of key points from one of the plurality of expressions to another of the plurality of expressions may be calculated in advance and stored in the preset database. As illustrated in FIG. 6, the values for adjusting the coordinates of the first set of key points on the currently-reconstructed 3D face model may be acquired by the following acts.

At block 1035, based on the current expression and the target expression, a preset database is queried, to acquire the values for adjusting the coordinates of the first set of key points, the preset database comprises a plurality of expressions.

In the actual execution, it may sometimes be difficult to adapt to personalized requirements of the user. Therefore, in an embodiment of the present disclosure, after generating the 3D face model representing to the target expression, the user is also provided with an adjustable space.

Figure 7:
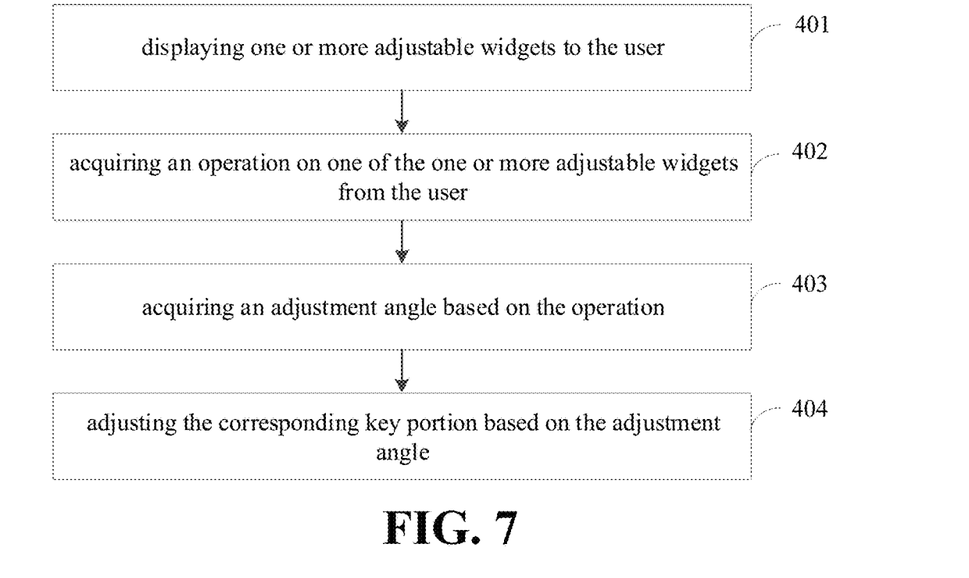
FIG. 7 is a flowchart of a method for replacing an expression according to embodiments of the present disclosure.

As illustrated in FIG. 7, after the act at block 104, the method further includes acts in the following blocks.

At block 401, one or more adjustable widgets are displayed to the user. Each of the one or more adjustable widgets is configured to adjust a corresponding key portion on the 3D face model representing the target expression within a preset range.

In order to switch the current expression to the target expression, the strength of the adjustable widget may be within the range, so as to ensure that the adjusted expression still belongs to the same category as the target expression. For example, the adjusted expression and the target expression both are sad. The preset ranges may be different due to different 3D face models.

Figure 8:
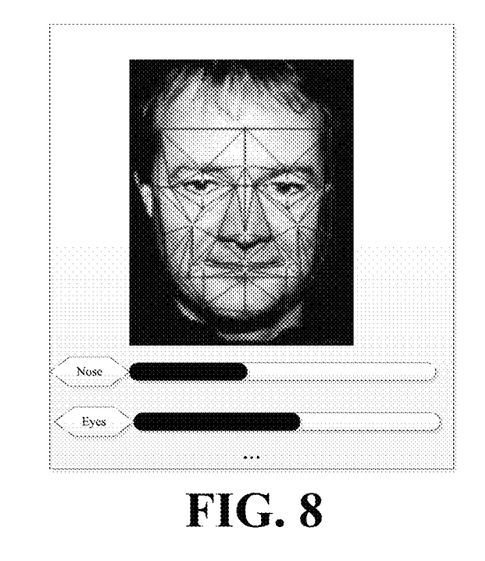
FIG. 8 is a schematic diagram of a scenario of a method for replacing an expression according to an embodiment of the present disclosure.

In detail, the adjustable widget corresponding to each key portion is generated. In this embodiment, the implementation manners of the adjustable widget may be different in different scenarios. As a possible implementation manner, the adjustable widget may be an adjustable progress bar. As illustrated in FIG. 8, an adjustable progress bar corresponding to each key portion is generated, and the user's movement operation on the adjustable progress bar corresponding to the key portion may be detected. Different progress locations of the progress bar may correspond to an adjustment angel of the key portion to a certain direction, for example, for eyes, different progress locations of the progress bar may correspond to different degrees of curvature of the eyes.

At block 402, an operation on one of the one or more adjustable widgets from the user is acquired.

At block 403, an adjustment angle is acquired based on the operation.

At block 404, the corresponding key portion is adjusted based on the adjustment angle.

Also, an identifier of the adjustable widget may be acquired. The identifier may be a name of a key portion or the like.

In detail, the operation from the user on the adjustable widget is acquired, and the identifier and the adjustment angle are acquired based on the operation. For example, when the adjustable widget is a progress bar, the key position corresponding to the progress bar dragged by the user and the corresponding drag distance (the drag distance corresponds to the adjustment angle) are acquired, and then the key portion corresponding to the identifier is adjusted based on the adjustment angle.

Therefore, in the embodiment, after ensuring that the 3D face model representing to the target expression is reconstructed, fine adjustment according to the user's personal preference may be performed on the basis of ensuring the target expression, which satisfies the personalized requirements of the user.

In an embodiment of the present disclosure, in order to further make the 3D face model representing to the target expression satisfy the personalized requirements of the user, the 3D face model representing to the target expression may also be adjusted based on the personal preference of the user.

Figure 9:
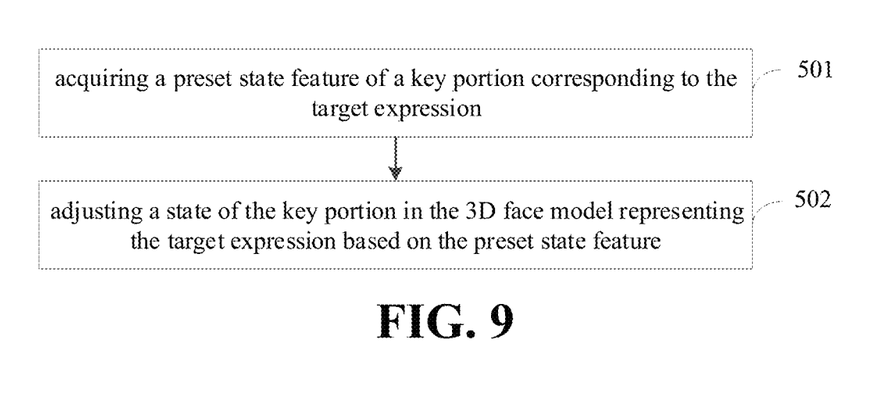
FIG. 9 is a flowchart of a method for replacing an expression according to embodiments of the present disclosure.

As illustrated in FIG. 9, after the above act at block 104, the method further includes act in the following blocks.

At block 501, a preset state feature of a key portion corresponding to the target expression is acquired.

The key portion corresponding to the target expression may be a relevant portion adapted to the target expression. For example, when the target expression is smile, the corresponding key portion may include a mouth, a cheek, and an eyebrow. Preset state features corresponding to key portions may include the states of the relevant portions. For example, when the key portion is eyes, the corresponding state feature may include open and close of eyes. The state features of the key portion may be preset by the user based on personal preferences.

At block 502, a state of the key portion in the 3D face model representing the target expression is adjusted based on the preset state feature.

In detail, the state of the corresponding key portion in the 3D face model is adjusted based on the state feature, so that the adjusted 3D face model is more in line with the user's personal preference. It needs that with the state of the key portion in this embodiment, it may render emotional effects consistent with the target expression rather than changing the emotion expressed by the target expression.

For example, when the target expression is big laugh, the acquired state feature of the key portion corresponding to the target expression is the sunken on the dimple and the cheek, thus the cheek position and the dimple position in the 3D face model is adjusted based on the state feature to create a dimple effect, making the happy mood rendered by laughter more prominent.

For example, when the target expression is smile, the state feature of the key portion corresponding to the target expression is the slight narrow of the right eye, thus the position of the right eye in the 3D face model is adjusted based on the state feature to create a blinking effect, making the happy mood rendered by the smile more prominent.

In conclusion, with the method for replacing the expression provided in the embodiments of the present disclosure, the current expression represented by the currently-reconstructed 3D face model is acquired; the target expression from the user is acquired; based on the current expression and the target expression, the values for adjusting the coordinates of the first set of key points on the currently-reconstructed 3D face model are acquired; and the coordinates of the first set of key points on the currently-reconstructed 3D face model are adjusted based on the values, to generate the 3D face model representing the target expression. Therefore, a speed of modeling the 3D face model based on expression replacement is improved.

Figure 10:
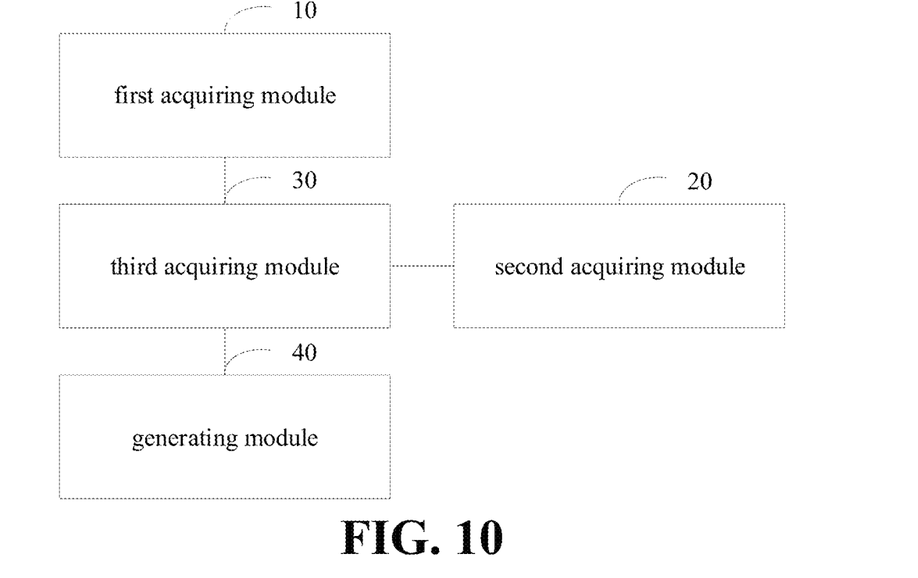
FIG. 10 is a block diagram of a device for replacing an expression according to embodiments of the present disclosure.

In order to implement the above embodiment, the present disclosure also provides a device for replacing an expression. FIG. 10 is a block diagram of a device for replacing an expression according to an embodiment of the present disclosure. As illustrated in FIG. 10, the device includes a first acquiring module 10, a second acquiring module 20, a third acquiring module 30, and a generating module 40.

The first acquiring module 10 is configured to acquire a current expression represented by a currently-reconstructed 3D face model.

The second acquiring module 20 is configured to acquire a target expression from a user.

The third acquiring module 30 is configured to acquire, based on the current expression and the target expression, values for adjusting coordinates of a first set of key points on the currently-reconstructed 3D face model.

The generating module 40 is configured to adjust the coordinates of the first set of key points on the currently-reconstructed 3D face model based on the values, to generate a 3D face model representing the target expression.

Figure 11:
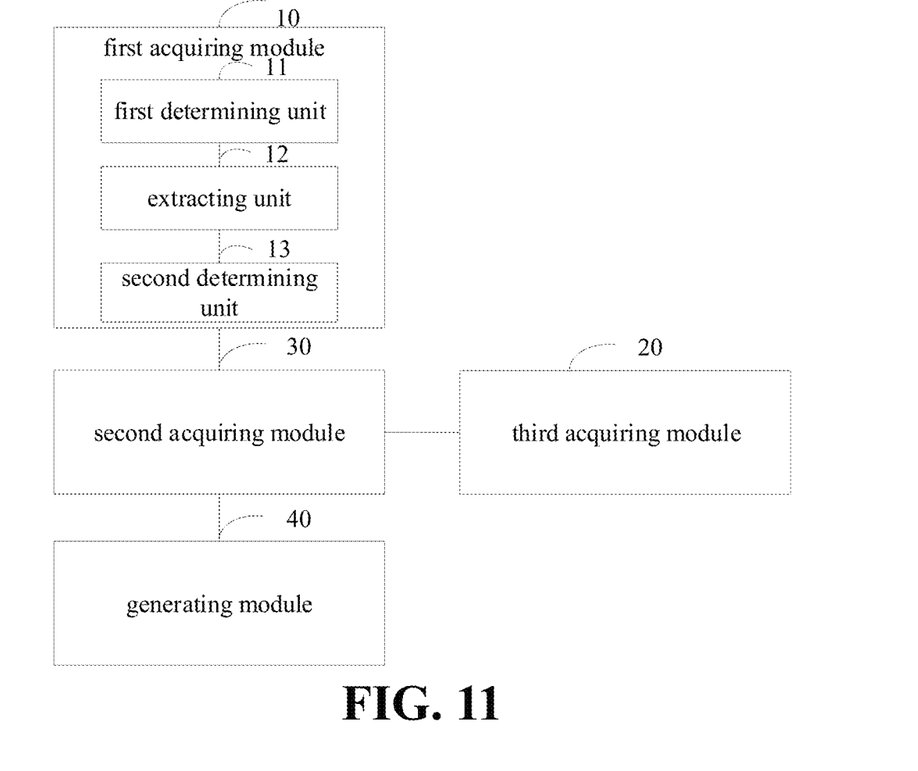
FIG. 11 is a block diagram of a device for replacing an expression according to embodiments of the present disclosure.

In an embodiment of the present disclosure, as illustrated in FIG. 11, on the basis of FIG. 10, the first acquiring module 10 includes a first determining unit 11, an extracting unit 12, and a second determining unit 13.

The first determining unit 11 is configured to determine key points of a plurality of key portions in the currently-reconstructed 3D face model.

The extracting unit 12 is configured to extract a feature vector of the plurality of key portions, based on coordinate information of the key points of the plurality of key portions and distances among the plurality of key portions.

The second determining unit 13 is configured to determine the current expression of the 3D face model, by analyzing the feature vector of the plurality of key portions through a pre-trained neural network.

In an embodiment of the present disclosure, the second acquiring module 20 is configured to display a list of expressions to the user and acquire an expression selected by the user on the list as the target expression.

In an embodiment of the present disclosure, the second acquiring module 20 is configured to capture an expression of the user by a camera; match the expression captured by the camera with a preset list of expressions; and in response to the expression captured by the camera matching one expression in the preset list, use the expression captured by the camera as the target expression.

In an embodiment of the present disclosure, the third acquiring module 30 is configured to: acquire a second set of key points of the current expression, and coordinates of the second set of key points; acquire a third set of key points of the target expression, and coordinates of the third set of key points; acquire the first set of key points based on the second set of key points and the third set of key points, and acquiring the values for adjusting the coordinates of the first set of key points based on the coordinates of the second set of key points and the coordinates of the third set of key points. The second set of key points of the current expression, and the coordinates of the second set of key points are preset. The third set of key points of the target expression, and the coordinates of the third set of key points are preset.

In an embodiment of the present disclosure, the third acquiring module 30 is configured to: query, based on the current expression and the target expression, a preset database to acquire the values for adjusting the coordinates of the first set of key points. The preset database includes a plurality of expressions, and values for adjusting coordinates of a corresponding set of key points from one of the plurality of expressions to another of the plurality of expressions.

Figure 12:
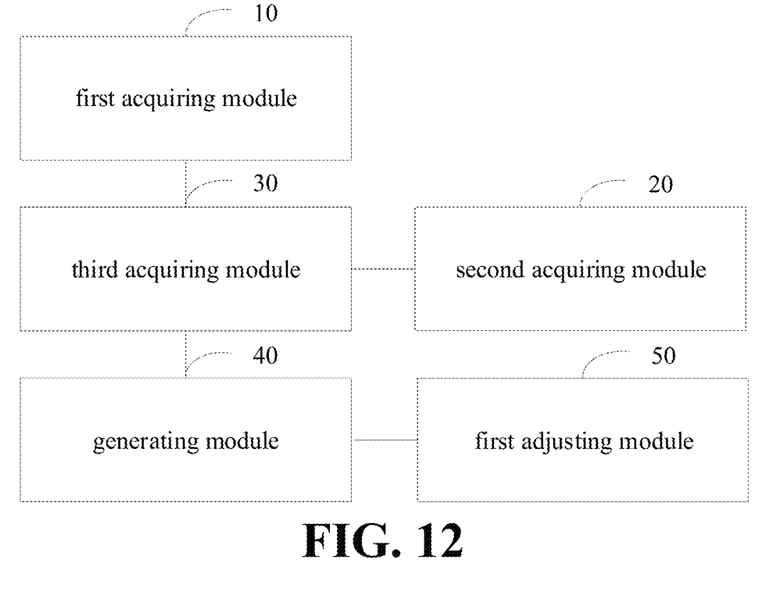
FIG. 12 is a block diagram of a device for replacing an expression according to embodiments of the present disclosure.

In an embodiment of the present disclosure, as illustrated in 12, the device further includes a first adjusting module 50. The first adjusting module 50 is configured to display one or more adjustable widgets to the user, each of the one or more adjustable widgets being configured to adjust a corresponding key portion on the 3D face model representing the target expression within a preset range; acquire an operation on one of the one or more adjustable widgets from the user; acquire an adjustment angle based on the operation; and adjust the corresponding key portion based on the adjustment angle.

Figure 13:
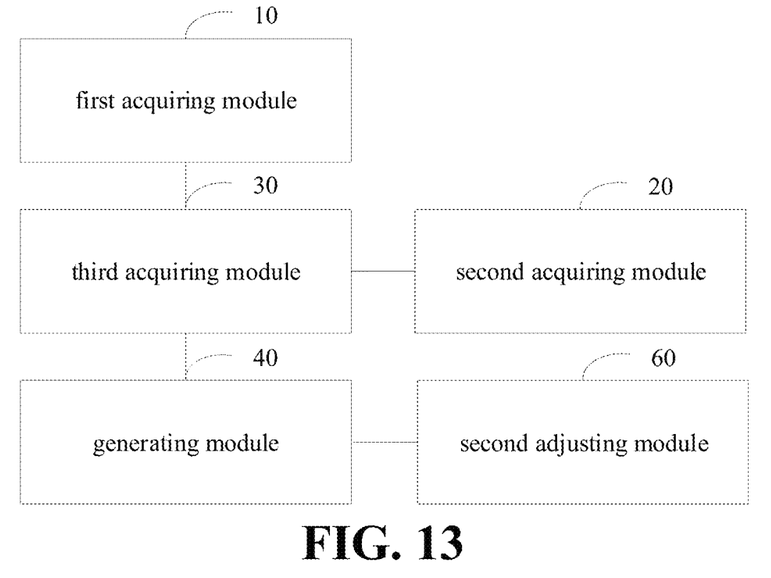
FIG. 13 is a block diagram of a device for replacing an expression according to embodiments of the present disclosure.

In an embodiment of the present disclosure, as illustrated in 13, the device further includes a second adjusting module 60. The second adjusting module 60 is configured to acquire a preset state feature of a key portion corresponding to the target expression; and adjust a state of the key portion in the 3D face model representing the target expression based on the preset state feature.

It should be noted that in the above explanation of the embodiment, the method for replacing the expression is also applicable to the device for replacing the expression, and details are not described herein again.

In order to implement the above embodiments, the present disclosure further provides a computer readable storage medium having a computer program stored thereon. The computer program is executed by a processor of the mobile terminal to implement the method for replacing the expression as described in the above embodiments.

In order to implement the above embodiments, the present disclosure also provides an electronic device.

Figure 14:
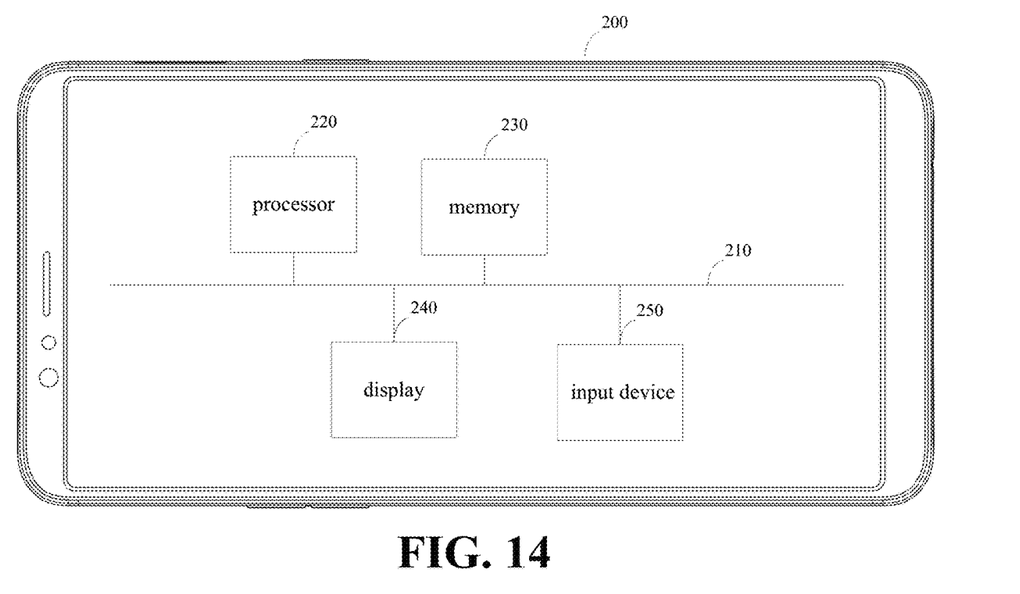
FIG. 14 is a schematic diagram of an electronic device according to an embodiment of the present disclosure.

FIG. 14 is a schematic diagram of an electronic device according to an embodiment of the present disclosure. The electronic device 200 includes a processor 220, a memory 230, a display 240, and an input device 250 that are coupled by a system bus 210. The memory 230 of the electronic device 200 stores an operating system and computer readable instructions. The computer readable instructions are executable by the processor 220 to implement the method for replacing the expression provided in the embodiments of the present disclosure. The processor 220 is configured to provide computing and control capabilities to support the operation of the entire electronic device 200. The display 240 of the electronic device 200 may be a liquid crystal display or an electronic ink display or the like. The input device 250 may be a touch layer covered on the display 240, or may be a button, a trackball or a touchpad disposed on the housing of the electronic device 200, or an external keyboard, a trackpad or a mouse. The electronic device 200 may be a mobile phone, a tablet computer, a notebook computer, a personal digital assistant, or a wearable device (e.g., a smart bracelet, a smart watch, a smart helmet, smart glasses).

It will be understood by those skilled in the art that the structure illustrated in FIG. 14 is only a schematic diagram of a portion of the structure related to the solution of the present disclosure, and does not constitute a limitation of the electronic device 200 to which the solution of the present disclosure is applied. The specific electronic device 200 may include more or fewer components than illustrated in the figures, or some combined components, or have different component arrangement.

Based on the above embodiments, in the embodiment of the present disclosure, the currently-reconstructed 3D face model may be implemented by an image processing circuit in the terminal device. In order to make the process of reconstructing the 3D face model clear for those skilled in the art, the following description is combined with a possible image processing circuit.

Figure 15:
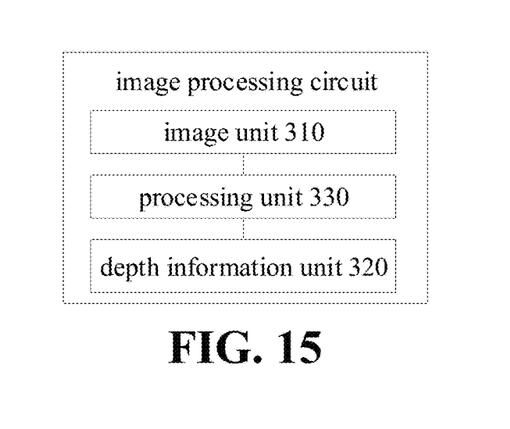
FIG. 15 is a block diagram of an image processing circuit in an embodiment.

As illustrated in FIG. 15, the image processing circuit includes an image unit 310, a depth information unit 320, and a processing unit 330.

The image unit 310 is configured to output one or more current original 2D face images of the user.

The depth information unit 320 is configured to output depth information corresponding to the one or more original 2D face images.

The processing unit 330 is electrically coupled to the image unit 310 and the depth information unit 320, and configured to perform 3D reconstruction based on the depth information and the one or more original 2D face images to acquire a 3D face model that displays the current expression.

In the embodiments of the present disclosure, the image unit 310 may include: an image sensor 311 and an image signal processing (ISP) processor 312 that are electrically coupled with each other.

The image sensor 311 is configured to output original image data.

The ISP processor 312 is configured to output the original 2D face image according to the original image data.

In the embodiments of the present disclosure, the original image data captured by the image sensor 311 is first processed by the ISP processor 312, which analyzes the original image data to capture image statistics information that may be used to determine one or more control parameters of the image sensor 311, including face images in YUV (Luma and Chroma) format or RGB format. The image sensor 311 may include a color filter array (such as a Bayer filter) and corresponding photosensitive units. The image sensor 311 may acquire light intensity and wavelength information captured by each photosensitive unit and provide a set of original image data that may be processed by the ISP processor 312. After processing the original image data, the ISP processor 312 acquires a face image in the YUV format or the RGB format and sends it to the processing unit 330.

The ISP processor 312 may process the original image data pixel by pixel in a plurality of formats when processing the original image data. For example, each image pixel may have a bit depth of 8, 10, 12, or 14 bits, and the ISP processor 312 may perform one or more image processing operations on the original image data, collect statistical information about the image data. The image processing operation may be performed with the same or different bit depth precision.

As a possible implementation manner, the depth information unit 320 includes a structured-light sensor 321 and a depth map generation chip 322 that are electrically coupled with each other.

The structured-light sensor 321 is configured to generate an infrared speckle pattern.

The depth map generation chip 322 is configured to output depth information corresponding to the original 2D face image based on the infrared speckle pattern.

In the embodiments of the present disclosure, the structured-light sensor 321 projects the speckle structure light to the subject, and acquires the structured light reflected by the subject, and acquire an infrared speckle pattern according to the reflected structure light by imaging. The structured-light sensor 321 sends the infrared speckle pattern to the depth map generation chip 322, so that the depth map generation chip 322 determines the morphological change of the structured light according to the infrared speckle pattern, and then determines the depth of the subject and acquire a depth map. The depth map indicates the depth of each pixel in the infrared speckle pattern. The depth map generation chip 322 transmits the depth map to the processing unit 330.

As a possible implementation, the processing unit 330 includes: a CPU (Central Processing Unit) 331 and a GPU (Graphics Processing Unit) 332 that are electrically coupled with each other.

The CPU 331 is configured to align the face image and the depth map according to the calibration data, and output the 3D face model according to the aligned face image and depth map.

The GPU 332 is configured to adjust coordinate information of reference key points according to coordinate differences to generate the 3D face model corresponding to the target expression.

In the embodiments of the present disclosure, the CPU 331 acquires a face image from the ISP processor 312, and acquires a depth map from the depth map generation chip 322, aligns the face image with the depth map by combining the previously acquired calibration data, to determine the depth information corresponding to each pixel in the face image. Further, the CPU 331 performs 3D reconstruction based on the depth information and the face image to acquire a 3D face model.

The CPU 331 transmits the 3D face model to the GPU 332 so that the GPU 332 executes the method for replacing the expression as described in the above embodiment.

Further, the image processing circuit may further include: a first display unit 341.

The first display unit 341 is electrically coupled to the processing unit 330 for displaying an adjustable widget of the key portion to be adjusted.

Further, the image processing circuit may further include: a second display unit 342.

The second display unit 342 is electrically coupled to the processing unit 340 for displaying the adjusted 3D face model.

Alternatively, the image processing circuit may further include: an encoder 350 and a memory 360.

In the embodiments of the present disclosure, the beautified face image processed by the GPU 332 may also be encoded by the encoder 350 and stored in the memory 360. The encoder 350 may be implemented by a coprocessor.

In an embodiment, there may be a plurality of the memory 360, or the memory 360 may be divided into a plurality of storage spaces. The image data processed by the GPU 332 may be stored in a dedicated memory, or a dedicated storage space, and may include DMA (Direct Memory Access) feature. The memory 360 may be configured to implement one or more frame buffers.

The above process will be described in detail below with reference to FIG. 16.

Figure 16:
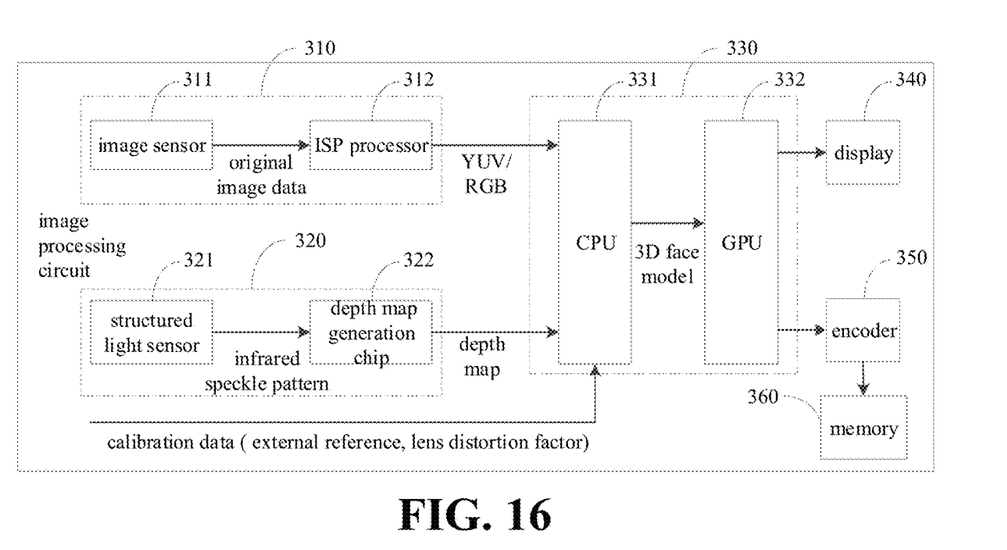
FIG. 16 is a schematic diagram of an image processing circuit as one possible implementation.

It should be noted that FIG. 16 is a schematic diagram of an image processing circuit as a possible implementation. For ease of explanation, only the various aspects related to the embodiments of the present disclosure are illustrated.

As illustrated in FIG. 16, the original image data captured by the image sensor 311 is first processed by the ISP processor 312, which analyzes the original image data to capture image statistics information that may be used to determine one or more control parameters of the image sensor 311, including face images in YUV format or RGB format. The image sensor 311 may include a color filter array (such as a Bayer filter) and corresponding photosensitive units. The image sensor 311 may acquire light intensity and wavelength information captured by each photosensitive unit and provide a set of original image data that may be processed by the ISP processor 312. The ISP processor 312 processes the original image data to acquire a face image in the YUV format or the RGB format, and transmits the face image to the CPU 331.

The ISP processor 312 may process the original image data pixel by pixel in a plurality of formats when processing the original image data. For example, each image pixel may have a bit depth of 8, 10, 12, or 14 bits, and the ISP processor 312 may perform one or more image processing operations on the original image data, collect statistical information about the image data. The image processing operations may be performed with the same or different bit depth precision.

As illustrated in FIG. 16, the structured-light sensor 321 projects the speckle structure light toward the subject, and acquires the structured light reflected by the subject, and acquire an infrared speckle pattern according to the reflected structured light. The structured-light sensor 321 transmits the infrared speckle pattern to the depth map generation chip 322, so that the depth map generation chip 322 determines the morphological change of the structured light according to the infrared speckle pattern, and then determines the depth of the subject to acquire a depth map. The depth map indicates the depth of each pixel in the infrared speckle pattern. The depth map generation chip 322 transmits the depth map to the CPU 331.

The CPU 331 acquires a face image from the ISP processor 312, and acquires a depth map from the depth map generation chip 322, aligns the face image with the depth map by combining the previously acquired calibration data, to determine the depth information corresponding to each pixel in the face image. Further, the CPU 331 performs 3D reconstruction based on the depth information and the face image to acquire a 3D face model The CPU 331 transmits the 3D face model to the GPU 332, so that the GPU 332 performs the method described in the above embodiment based on the 3D face model to generate the 3D face model corresponding to the target expression. The 3D face model corresponding to the target expression, processed by the GPU 332, may be represented by the display 340 (including the first display unit 341 and the second display unit 351 described above), and/or encoded by the encoder 350 and stored in the memory 360. The encoder 350 is implemented by a coprocessor.

In an embodiment, there may be a plurality of the memory 360, or the memory 360 may be divided into a plurality of storage spaces. The image data processed by the GPU 332 may be stored in a dedicated memory, or a dedicated storage space, and may include DMA (Direct Memory Access) feature. The memory 360 may be configured to implement one or more frame buffers.

For example, the following acts are implemented by using the processor 220 in FIG. 14 or using the imaging processing circuits (the CPU 331 and the GPU 332) in FIG. 16.

The CPU 331 acquires a 2D face image and depth information corresponding to the face image. The CPU 331 performs 3D reconstruction according to the depth information and the face image to acquire a 3D face model. The GPU 332 acquires adjusting parameters of the 3D face model for the user, and adjusts key points on the original 3D face model based on the shaping parameters of the 3D face model, to acquire a 3D face model corresponding to the target expression In the description of the present disclosure, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases in various places throughout this specification are not necessarily referring to the same embodiment or example of the present disclosure. Furthermore, the particular features, structures, materials, or characteristics may be combined in any suitable manner in one or more embodiments or examples. Without a contradiction, the different embodiments or examples and the features of the different embodiments or examples may be combined by those skilled in the art.

In addition, terms such as "first" and "second" are used herein for purposes of description and are not intended to indicate or imply relative importance or significance. Furthermore, the feature defined with "first" and "second" may comprise one or more this feature distinctly or implicitly. In the description of the present disclosure, "a plurality of" means two or more than two, unless specified otherwise.

The flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to acquire the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or portions of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc. Although explanatory embodiments have been shown and described, it would be appreciated by those skilled in the art that the above embodiments cannot be construed to limit the present disclosure, and changes, alternatives, and modifications may be made in the embodiments without departing from spirit, principles and scope of the present disclosure.

What is claimed is:

1. A method for replacing an expression, comprising:
acquiring a current expression represented by a currently-reconstructed three-dimensional (3D) face model, wherein the current expression is acquired by acts of:
scanning the currently-reconstructed 3D face model to acquire a plurality of key portions and key points of the plurality of key portions;
extracting a feature vector of the plurality of key portions based on coordinates of the key points of the plurality of key portions and distances among the plurality of key portions; and
analyzing the feature vector by a pre-trained neural network model to determine the current expression;
acquiring a target expression from a user, comprising:
capturing an expression of the user by a camera;
matching the expression captured by the camera with a preset list of expressions, and
in response to the expression captured by the camera matching one expression in the preset list, using the expression captured by the camera as the target expression;
acquiring, based on the current expression and the target expression, values for adjusting coordinates of a first set of key points on the currently-reconstructed 3D face model, comprising:
querying, based on the current expression and the target expression, a preset database to acquire the values for adjusting the coordinates of the first set of key points, the preset database comprises a plurality of expressions, and values for adjusting coordinates of a corresponding set of key points from one of the plurality of expressions to another of the plurality of expressions; and
adjusting the coordinates of the first set of key points on the currently-reconstructed 3D face model based on the values, to generate a 3D face model representing the target expression.

2. The method of claim 1, further comprising:
displaying one or more adjustable widgets, each of the one or more adjustable widgets being configured to adjust a corresponding key portion on the 3D face model representing the target expression within a preset range;
acquiring an operation on one of the one or more adjustable widgets;
acquiring an adjustment angle based on the operation; and
adjusting the corresponding key portion based on the adjustment angle.

3. The method of claim 1, further comprising:
acquiring a preset state feature of a key portion corresponding to the target expression; and
adjusting a state of the key portion in the 3D face model representing the target expression based on the preset state feature.

4. An electronic device, comprising:
a computer program;
a memory, configured to store the computer program; and
a processor, configured to execute the computer program to carry out:
acquiring a current expression represented by a currently-reconstructed 3D face model, wherein the current expression is acquired by acts of:
scanning the currently-reconstructed 3D face model to acquire a plurality of key portions and key points of the plurality of key portions;
extracting a feature vector of the plurality of key portions based on coordinates of the key points of the plurality of key portions and distances among the plurality of key portions; and
analyzing the feature vector by a pre-trained neural network model to determine the current expression;
acquiring a target expression from a user, comprising:
capturing an expression of the user by a camera;
matching the expression captured by the camera with a preset list of expressions; and
in response to the expression captured by the camera matching one expression in the preset list, using the expression captured by the camera as the target expression;
acquiring, based on the current expression and the target expression, values for adjusting coordinates of a first set of key points on the currently-reconstructed 3D face model, comprising:

querying, based on the current expression and the target expression, a preset database to acquire the values for adjusting the coordinates of the first set of key points, the preset database comprises a plurality of expressions, and values for adjusting coordinates of a corresponding set of key points from one of the plurality of expressions to another of the plurality of expressions; and adjusting the coordinates of the first set of key points on the currently-reconstructed 3D face model based on the values, to generate a 3D face model representing the target expression.

5. The electronic device of claim 4, wherein the processor is further configured to execute the computer program to carry out:

displaying one or more adjustable widgets, each of the one or more adjustable widgets being configured to adjust a corresponding key portion on the 3D face model representing the target expression within a preset range;

acquiring an operation on one of the one or more adjustable widgets from the user;

acquiring an adjustment angle based on the operation; and adjusting the corresponding key portion based on the adjustment angle.

6. The electronic device of claim 4, wherein the processor is further configured to execute the computer program to carry out:

acquiring a preset state feature of a key portion corresponding to the target expression; and adjusting a state of the key portion in the 3D face model representing the target expression based on the preset state feature.

7. A non-transient computer readable storage medium having a computer program stored thereon, wherein the computer program causes an electronic device to carry out:

acquiring a current expression represented by a currently-reconstructed 3D face model, wherein the current expression is acquired by acts of:

scanning the currently-reconstructed 3D face model to acquire a plurality of key portions and key points of the plurality of key portions;

extracting a feature vector of the plurality of key portions based on coordinates of the key points of the plurality of key portions and distances among the plurality of key portions; and analyzing the feature vector by a pre-trained neural network model to determine the current expression;

acquiring a target expression from a user, comprising:

capturing an expression of the user by a camera;

matching the expression captured by the camera with a preset list of expressions; and in response to the expression captured by the camera matching one expression in the pre list, using the expression captured by the camera as the target expression;

acquiring, based on the current expression and the target expression, values for adjusting coinages of a first set of key points on the currently-reconstructed 3D face model, comprising:

querying, based on the current expression and the target expression, a preset database to acquire the values for adjusting the coordinates of the first set of key points, the preset database comprises a plurality of expressions, and values for adjusting coordinate; of a corresponding set of key points from one of the plurality of expressions to another of the plurality of expression; and adjusting the coordinates of the first set of key points on the currently-reconstructed 3D face model based on the values, to generate a 3D face model representing the target expression.

8. The non-transient computer readable storage medium of claim 7, wherein the computer program causes an electronic device to further carry out:

displaying one or more adjustable widgets, each of the one or more adjustable widgets being configured to adjust a corresponding key portion on the 3D face model representing the target expression within a preset range;

acquiring an operation on one of the one or more adjustable widgets from the user;

acquiring an adjustment angle based on the operation; and adjusting the corresponding key portion based on the adjustment angle, or acquiring a preset state feature of a key portion corresponding to the target expression; and adjusting a state of the key portion in the 3D face model representing the target expression based on the preset state feature.

* * * * *